United States Patent
Khanna

(10) Patent No.: US 11,416,738 B1
(45) Date of Patent: Aug. 16, 2022

(54) MODEL REUTILIZATION WITH HETEROGENEOUS SENSOR STACKS VIA SENSOR DATA AUTO-NORMALIZATION

(71) Applicant: Amazon Technologies, Inc., Seattle, WA (US)

(72) Inventor: Aran Khanna, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 1213 days.

(21) Appl. No.: 15/819,878

(22) Filed: Nov. 21, 2017

(51) Int. Cl.
*G06N 3/08* (2006.01)

(52) U.S. Cl.
CPC ..................................... *G06N 3/08* (2013.01)

(58) Field of Classification Search
CPC . G06N 20/00; G06N 3/08; G06N 3/04; G06F 17/30707; G06K 9/6269
USPC .......................................................... 706/20
See application file for complete search history.

(56) References Cited

U.S. PATENT DOCUMENTS

| 10,332,028 | B2* | 6/2019 | Talathi | G06K 9/6257 |
| 10,373,050 | B2* | 8/2019 | Lin | G06N 3/04 |
| 10,410,096 | B2* | 9/2019 | Dijkman | G06N 3/02 |

* cited by examiner

*Primary Examiner* — Viker A Lamardo
(74) *Attorney, Agent, or Firm* — Nicholson De Vos Webster & Elliott, LLP

(57) ABSTRACT

Techniques for model reutilization with heterogeneous sensor stacks via sensor data auto-normalization are described. A normalization model can be trained and utilized to normalize sensor data generated by a first type of sensor stack so that it can be used with an existing machine learning model that was trained using data from another type or types of sensor stacks having different characteristics. A sensor data can be generated by the sensor stack and provided as an input to the normalization model to yield normalized sensor data. The normalized sensor data can be provided as input to the existing model to generate accurate results despite the sensor stack having different characteristics than the one(s) used to train the machine learning model.

20 Claims, 10 Drawing Sheets

MODEL REUTILIZATION WITH HETEROGENEOUS SENSOR STACKS VIA SENSOR DATA AUTO-NORMALIZATION

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Figure 1:
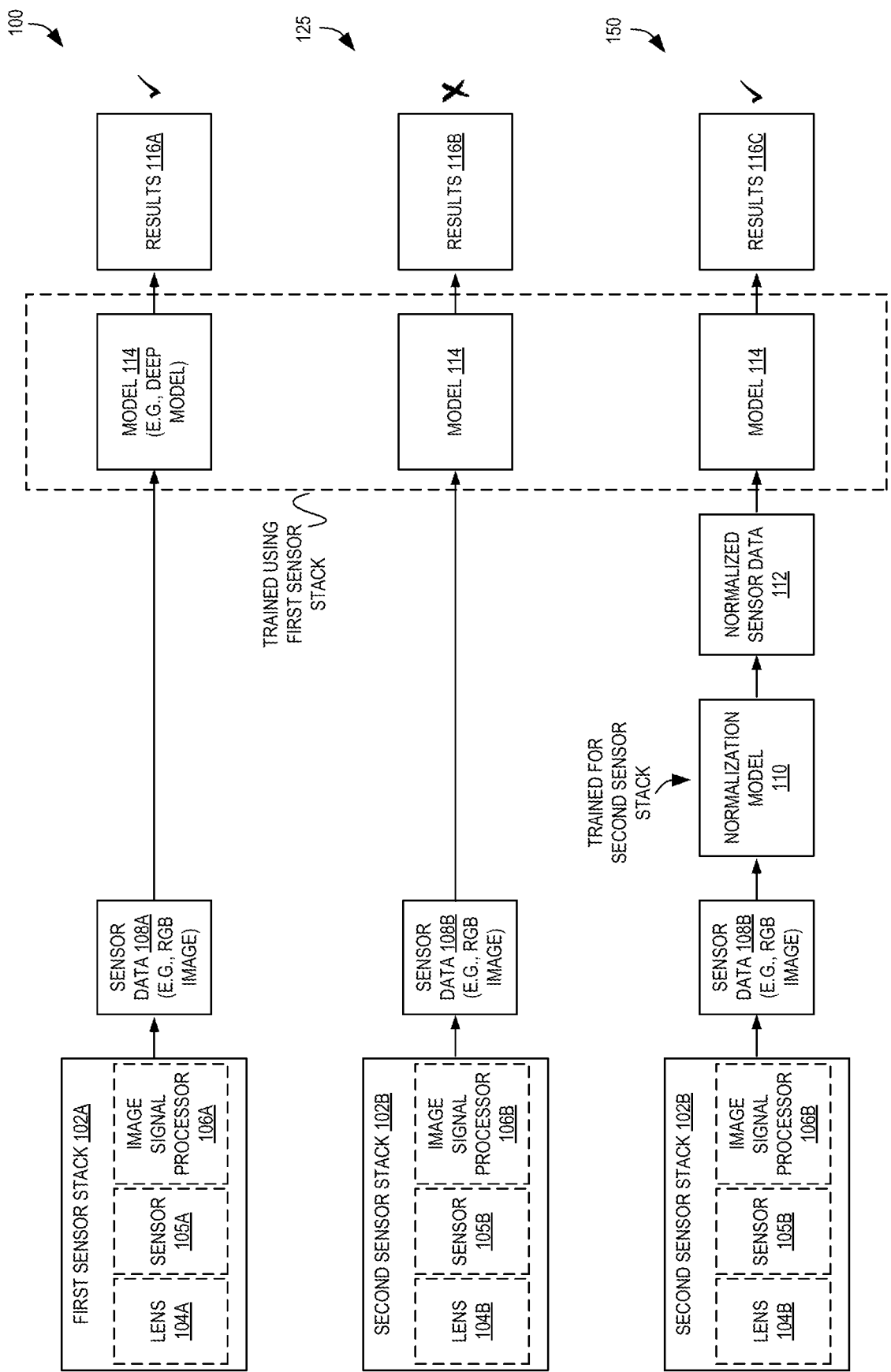
FIG. 1 is a diagram illustrating environments for model reutilization with heterogeneous sensor stacks via sensor data auto-normalization according to some embodiments.

Various embodiments of methods, apparatus, systems, and non-transitory computer-readable storage media for model reutilization with heterogeneous sensor stacks via sensor data auto-normalization are described. According to some embodiments, a machine learning model that was trained using training data acquired from first type of device (e.g., having a first sensor stack of components, such as a mobile phone) can be re-used with a second type of device (e.g., having a second sensor stack of components, such as a security camera, resulting in different data characteristics) with extremely similar or near-equivalent accuracy by normalizing the sensor data from the second type of device, and using this normalized data with the existing machine learning model. Thus, in some embodiments, a same machine learning model can be flexibly re-used with sensor data generated by differing types of sensor stacks, eliminating the need to train multiple specific models for each type of sensor stack to be used, or to specifically tune the sensor stack of devices sought to be utilized. As a result, an existing model that may have been tuned and improved with substantial effort can be easily re-used for other types of devices, or can continue to be used for subsequent improved versions of a device that may utilize different sensor stacks.

Machine learning models trained on sensor data, such as image and audio data, are often trained on heavily-biased sensor data pulled at scale from publicly-available sources. For example, one frequently-used source of sensor data used to train models is referred to as "ImageNet." ImageNet is a large visual database designed for use in visual object recognition software research, and provides annotations (and in many cases, bounding boxes) for tens of millions of images through hand-annotation to indicate what objects are pictured therein. This source, which references images available on the internet, relies heavily on data from smartphones and consumer or professional cameras such as digital single-lens reflex camera (DSLR) cameras. These types of cameras utilize similar sensor stacks of components to create photographs. For example, these types of sensor stacks have image signal processors (ISPs) that transform the raw sensor data in a very predictable way to make them appear as expected to humans. However, when a model trained on this dataset is deployed on an image stream from a camera that is calibrated differently—for example, a security camera that is calibrated to display low light data—the accuracy of the model suffers from the covariate shift to the input data caused by the ISP being tuned differently on such a security camera compared to the ISPs of the cameras that produced the training set (i.e., that the model is based on).

As such shifts are largely consistent, in some embodiments these shifts can be learned and corrected for, and thus models trained on relatively consistent external data sets do not need to be fine-tuned against new data collected on a different device to accurately operate on that data. Accordingly, sensor data from different devices can be transformed into having a same distribution as that learned by an existing model. Notably, this technique is not limited to just cameras having optical sensor stacks, and it can be applied to many different devices and sensor stack types where a model is trained on processed versions of raw data taken in by the sensors (e.g., through some hardware-level preprocessing component, like an audio digital signal processor (DSP), biomedical electrode, image signal processor (ISP), etc.) and a desire exists to use the same model with sensor data from another type of device with different hardware-level sensor/preprocessing components.

In some embodiments, the shift introduced by a different sensor stack can be "corrected" via a normalization model that normalizes the sensor data. These normalization models can be trained according to a variety of techniques. For example, one technique includes generating sensor data from common subject matter using the "new" sensor stack and the previous sensor stack (used to train the existing model), applying each type of sensor data to the existing model, and training the normalization model by using the results of the model (e.g., using an optimization procedure, such as the use of Stochastic Gradient Descent (SGD) techniques or similar known to those of skill in the art) to find parameters to pre-process the data (from the "new" sensor stack) such that accuracy of the pre-trained common models is maximized. Alternatively, an existing sensor data set originally generated using a first type (or types) of sensor stacks can be obtained (e.g., from a public or private source such as an image bank) and input into the existing model, and additional sensor data can be generated using the "new" sensor stack to capture similar subject matter (as represented by the existing sensor data set) and input into the common model. The results from each can similarly be used to tune the normalization model to cause it to transform sensor data from the new sensor stack to result in highly-accurate results when processed by the existing model.

Accordingly, embodiments can beneficially ensure the easy portability of models trained on commonly-available sensor data sets to be used on a wide range of heterogeneous hardware sensor stacks, as each sensor and processing stack may uniquely skew input data. Thus, additional models need not be trained for each particular hardware sensor stack type—which is extremely expensive in terms of time and compute resources. Similarly, the hardware sensor stacks of devices that would seek to use existing models would not need to be manually tuned, which is also expensive in terms of time and compute resources, and which may not even be possible.

For further detail, FIG. 1 is a diagram illustrating environments for model reutilization with heterogeneous sensor stacks via sensor data auto-normalization according to some embodiments. FIG. 1 illustrates three environments 100/125/150 in which a model 114 can be utilized.

As indicated above, a model 114 can be a machine learning model—e.g., a neural network, recurrent neural network (RNN), convolutional neural network (CNN), or other type of perceptron or model such as a classifier, clustering techinque, linear regression model, etc. Machine learning models can be "trained" using training data such as sensor data—e.g., digital images, audio and/or video recordings, numeric data such as temperature data, pressure data, biological data, etc. —generated by one or more types of devices having one or more types of sensor stacks. The model 114 can be any of a variety of types of machine learning based models and applied for any of a variety of uses. For example, the model 114 could be an image recognition model—e.g., to detect faces, to detect automobiles, to detect license plate numbers, etc. —and be applied in a variety of applications—e.g., security applications, social media applications, financial applications, identification/prediction applications, etc.

For example, a model 114 may be trained using images captured by cellular phones and/or digital cameras having a similar sensor stack 102A or configuration thereof. The illustrated first sensor stack 102A may be a part of a camera device, which may include a lens 104A, a sensor 105A (e.g., to detect and convey the information that constitutes an image, such as through a Bayer filter mosaic to provide a raw image), and an image signal processor 106A (ISP), that collectively allow the first sensor stack 102A to "capture" an image as sensor data 108A—e.g., a Red-Green-Blue (RGB) image. A lens 104A can be of a particular size and shape to allow light to enter the camera unit, where the light is "captured" by the sensor 105A (e.g., including photodiodes that perform a conversion of light into electrical charge) to yield a Bayer image, for example, that can be further processed by an ISP 106A to convert an image into digital form while performing some operations on the images to get an enhanced image (e.g., via importing the image, analyzing and manipulating it with data compression and/or enhancements to spot patterns that are not discernible to the naked eye, and converting the image to an outputted sensor data 108A). Of course, many other components and configurations thereof can be used in different sensor stacks for cameras, and further, many other types of components and configurations thereof can be used for other types of sensor stacks that are known to those of skill in the art, such as those for sensing light, moisture, acceleration, sound (e.g., via coils of a microphone that vibrate and are turned into digital data), temperature, pressure, flow, proximity, gas, chemical, bioelectric signals, etc., as part of any of a variety of types of devices such as cameras, audio recording devices, a cellular device or smartphone, tablet device, water sensor, motion sensor, biomedical sensor device, and so forth.

Notably, different sensor stacks 102A having different components and/or configurations are commonly used by different devices, even by those of a same or similar type. For example, sensor stacks 102A in smartphones may use relatively similar sensor stack configurations, though these might be completely different than sensor stack configurations of security cameras, which may be tuned (e.g., via ISP tuning) to include or remove certain artifacts or features of the outputted sensor data, utilize different types of components, utilize a different setting (e.g., a different dynamic range), etc. Accordingly, as there is no fundamental "correct" way of how to capture an image (or other "sensed" environmental data), each device creator may configure their sensor stack according to their own preference, resulting in disparate types and configurations of sensor stacks, leading to disparate types of data being captured. For example, some security cameras may have an ISP tuned to capture different wavelengths of light, gamma radiation, etc., when compared with a traditional DSLR camera.

Thus, in the case 100 where a model 114 is generated based on training data from a sensor stack or sensor stacks that is mostly similar to a first sensor stack 102A that will provide actual input data (e.g., sensor data 108A) for the model 114, the model 114 will likely perform quite well and generate accurate results 116A (e.g., predicated values, classes, etc.).

However, in contrast at case 150, if that same model 114 is used with sensor data 108B generated by a different (second) sensor stack 102A (having one or more different components and/or configurations, such as a different lens 104B, sensor 105B, and/or ISP 106B) leading to different sensor data 108 (even when compared to a theoretical same image being captured by the first sensor stack 102A), the generated results 116B may be of degraded (i.e., worse) quality when compared to the results 116A of the first case 100.

As indicated above, to remedy this situation a different model 114 could potentially be generated for use with sensor data 108B from such a different sensor stack 102B, though this may be extremely expensive in terms of training time required, or may be infeasible due to a lack of proper training data for the stack, etc. Additionally, as the second sensor stack 102B could potentially be re-tuned by a manufacturer of the sensor stack 102B, though this is likely implausible.

Instead, according to some embodiments, a normalization model 110 can be trained for the second sensor stack 102 (and optionally for "similar" sensor stacks producing similar sensor data) to effectively normalize (or "convert") the sensor data 108B generated by the second sensor stack 102B to yield normalized sensor data 112 that can be input into the model 114 (again, trained using first sensor stack 102A data or similar) that will yield substantially similar, if not the same, results 116C as would occur in the first case 100 where the model 114 corresponds to the sensor stack 102A. Such normalization models 110 can be trained for a variety of types of sensor stacks 102B, thus enabling a single model 114 (or models) trained using one type of sensor data to relatively easily be reused in other environments, simply by inputting sensor data 108B to the normalization model 110 to yield normalized sensor data 112 to be input to the model 114. Normalization models 110 can be relatively lightweight in terms of size, resource requirements, and execution time, and flexibly deployed in a variety of formats executable in different environments.

Figure 2A:
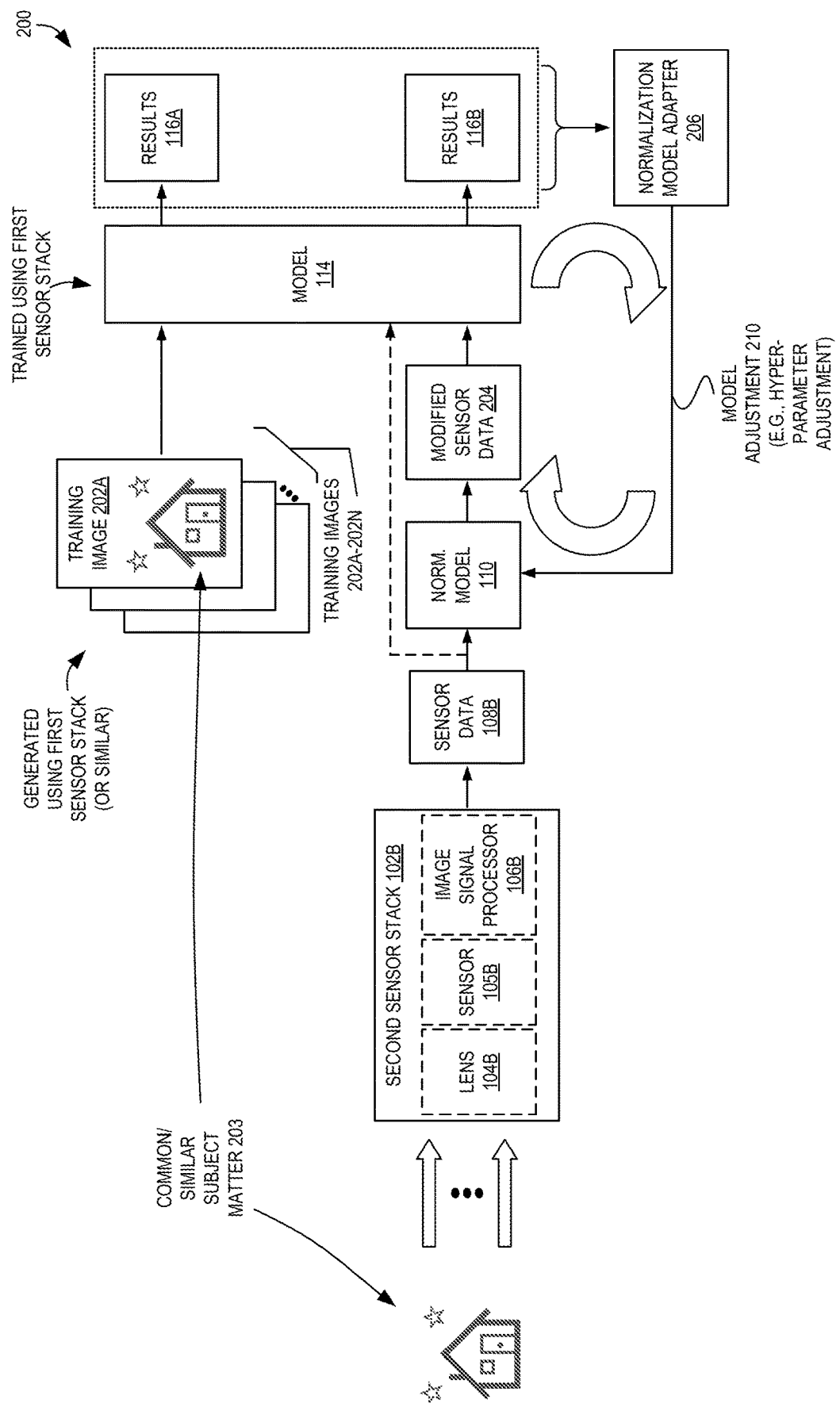
FIG. 2A is a diagram illustrating an exemplary technique for normalization model training utilizing a set of training images according to some embodiments.

FIG. 2A is a diagram illustrating an exemplary technique for normalization model training according to some embodiments. As indicated above, a normalization model 110 can be trained for a particular sensor stack (e.g., second sensor stack 102B) to allow sensor data of that sensor stack to be used with a model 114 trained for a different sensor stack (e.g., the first sensor strack 102A of FIG. 1). A variety of techniques can be used to generate a normalization model 110; one such technique is illustrated in FIG. 2.

The normalization model 110 can be any of a variety of types of models. In some embodiments, the normalization model 110 is a CNN. The CNN may include convolutions at the outsets (of the input sensor data), possibly one or more nonlinear activation layers, pooling/downsampling, one or (typically) multiple fully-connected layers at the middle that serve to "contract" the data, and/or a layer of sampling (or "de-convolution") to bring the back to the original input data size. Such a model may have a variety of types of "tunable" parameters (e.g., hyperparameters, model parameters) known to those of skill in the art that can be set/adjusted to modify how the model is trained, such as values for a learning rate (that controls how much to update the weight in the optimization algorithm), a number of epochs (the number of times the entire training set passes through the neural network), a batch size, an activation function, a number of hidden layers/units, a specific type of the model, weights, dropout for regularization, etc.

As shown, an existing set of training data (e.g., training images 202A-202N) can be obtained, such as by retrieving data from a publicly accessible data set (e.g., an online database or data source) or private data set. In some embodiments, this training data is selected due to it having been generated using a particular type (or similar type) of sensor stack as that which was used to train the model 114. Thus, the training data will have a similar distribution that matches or substantially matches the data upon which the model was trained. For example, the training data may be from one or more types of smartphones (e.g., images) when the model 114 was trained using images from a smartphone The training data (e.g., training images 202A-202N) from the first sensor stack 102A can be input to the model 114 to generate results 116A. Additionally, the second sensor stack 102B can be used to generate sensor data 108B by causing it to sense common or similar subject matter 203 to that which is represented in the initial existing training set. This sensor data 108B may be provided as an input directly to the model 114, and to generate results 116B. However, in some embodiments, the sensor data 108B is provided as an input to an (initially) non-trained normalization model 110, resulting in modified sensor data 204 that can be input to the model 114 to generate results 116B. For an initial image 202A, the (not-yet-trained) normalization model 110 may not change the sensor data 108B and thus the modified sensor data 204 may be the same, and thus in some embodiments sensor data 108B for an initial training image may be provided straight to the model 114.

With the pair of results 116A-116B, a normalization model adapter 206 component—e.g., software, hardware, or a combination of both—can use the differences between the results 116A-116B to make one or more model adjustments 210 (e.g., by modifying parameters to the normalization model 110) to cause the results 116B to match (or substantially match) the results 116A. For example, in some embodiments the normalization model adapter 206 can implement an optimization procedure known to those of skill in the art (e.g., a gradient descent type optimization technique such as SGD, Batch gradient descent, Mini-batch gradient descent, etc.) to fit the normalization model. Thus, the normalization model adapter 206 can learn the variance between the images obtained from the respective sensor stacks of similar subjects, and configure the normalization model 110 to adjust for that variance. After performing such model adjustment 210 operations for the entire set of training images 202A-202N (and corresponding sensor data 108B), the normalization model 110 is effectively configured to "normalize" the sensor data 108B from the second sensor stack 102B so that the model 114 will generate the proper results 116B.

Figure 2B:
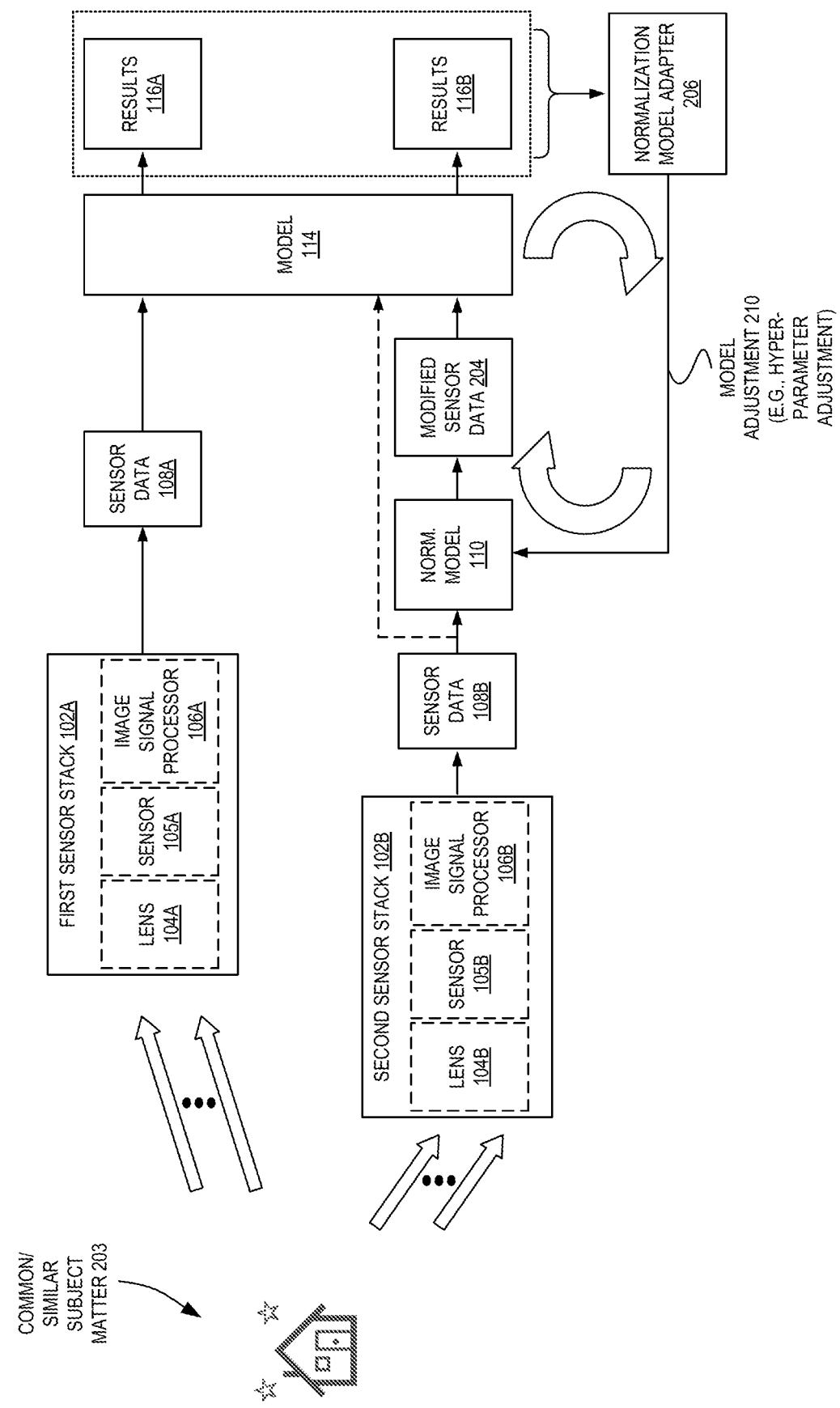
FIG. 2B is a diagram illustrating an exemplary technique for normalization model training utilizing common subject matter according to some embodiments.

However, other techniques for training a normalization model also exist. For example, FIG. 2B is a diagram illustrating an exemplary technique for normalization model training utilizing common subject matter 203 according to some embodiments. In this case, both the original sensor stack 102A (e.g., that generated earlier training data upon which the model 114 was trained) and the second sensor stack 102B can generate sensor data 108A-108B by sensing common or similar subject matter 203. For example, both sensor stacks 102A-102B can be placed in a same/adjacent position in a common environment, and both can generate sensor data by sensing subject matter (e.g., light, a sound, etc.)—possibly at a same time though also possibly at different points in time—from a very similar position to generate sensor data 108A-108B, respectively. Thereafter, the sensor data 108A-108B can again be input into the model 114 (as described with regard to FIG. 2A) to cause the normalization model adapter 206 to tune the normalization model 110 to auto-normalize sensor data from the second sensor stack 102B.

Figure 3:
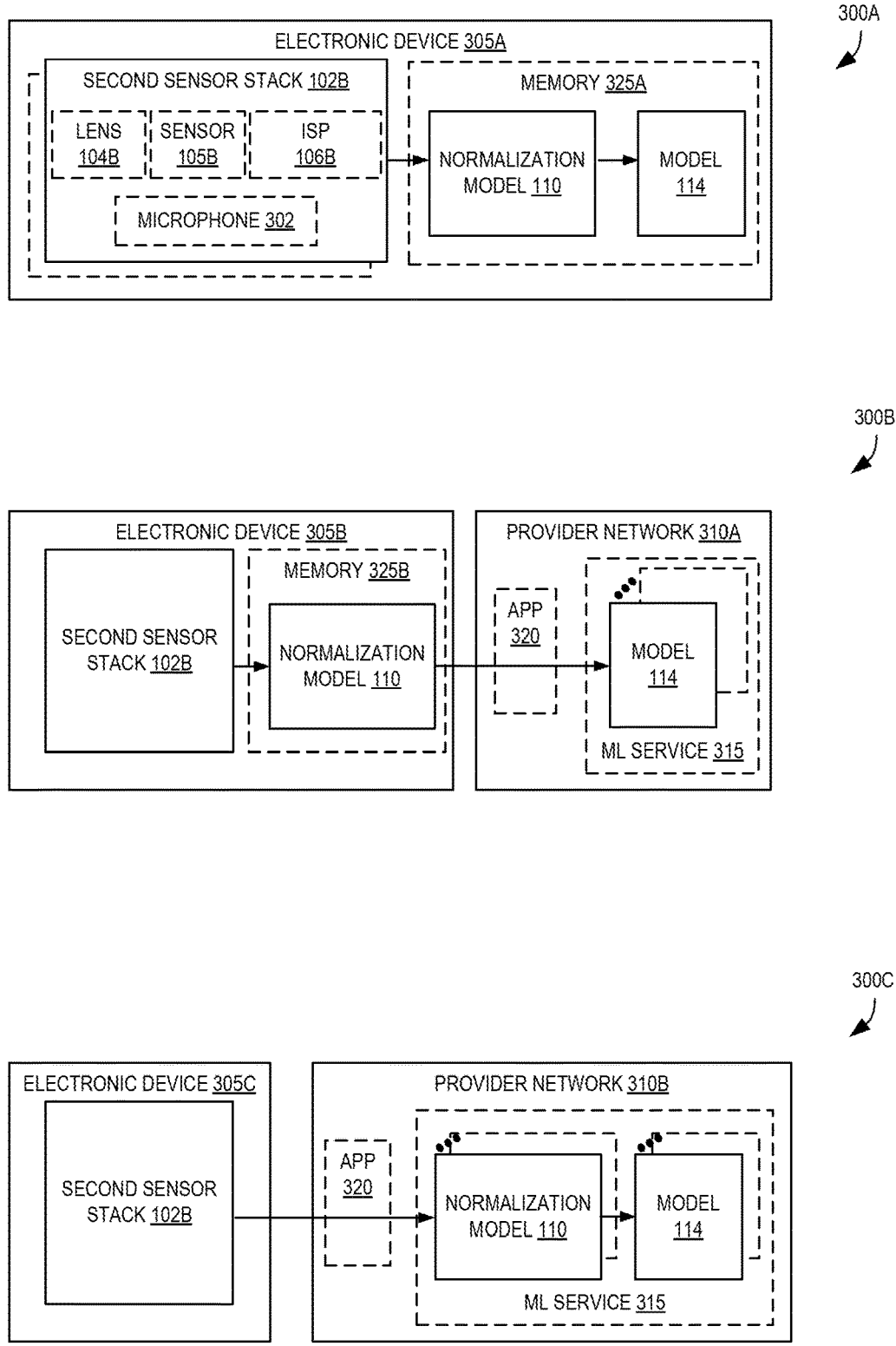
FIG. 3 is a diagram illustrating exemplary deployments involving normalization models with heterogeneous sensor stacks according to some embodiments.

The normalization model 110, model 114, and sensor stack 102B can flexibly be deployed in different environments and configurations for different purposes. For example, FIG. 3 is a diagram illustrating exemplary deployments involving normalization models with heterogeneous sensor stacks according to some embodiments.

One such deployment configuration 300A involves deploying the normalization model 110 and model 114 (e.g., within a volatile or non-volatile memory 325A such as a non-transitory computer-readable storage medium) within an electronic device 305A that also includes the second sensor stack 102B. For example, a camera electronic device 305A may include a sensor stack 102B that generates sensor data (e.g., a representation of an image) and provides that sensor data as an input to the normalization model 110 (e.g., executed by one or more non-illustrated processors of the device) to yield normalized sensor data to be provided to the model 114 to yield results, which can be used by the electronic device 305A (e.g., an application executing thereupon) to control its execution, such as by transmitting an indication of the results to another device (e.g., using a wired or wireless network interface of the electronic device 305A), causing an indication of the results to be presented (e.g., via an input/output interface to a display device, speaker device, etc.) to a user of the electronic device 305A, etc. As another example, the electronic device 305A may comprise a "smart speaker" device including one or more microphones 302 (and/or audio processing circuitry) and the model 114 may comprise a speech recognition model that can be re-used by multiple microphone sensor stacks within a same device, by different smart speaker devices having a different microphone sensor stack, by a later-developed model of the smart speaker using a different microphone sensor stack, etc.

Another deployment configuration 300B involves deploying the normalization model 110 (e.g., within a volatile or non-volatile memory 325B such as a non-transitory computer-readable storage medium) within an electronic device 305B that also includes the second sensor stack 102B. However, in this configuration 300B, the model 114 may be implemented at a separate one or more electronic devices, such as within a provider network 310A, and accessed via an application 320 executing within the provider network 310A, a machine learning service 315 of the provider network 310A (e.g., allowing users to train and/or execute machine learning models). Thus, the electronic device 305B may send the normalized sensor data created by the normalization model 110 (e.g., via a network interface across one or more networks) to the provider network 310A to be inputted into a model 114 executed therein.

A provider network provides users with the ability to utilize one or more of a variety of types of computing-related resources such as compute resources (e.g., executing virtual machine (VM) instances and/or containers, executing batch jobs, executing code without provisioning servers), data/ storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks may utilize one or more user accounts that are associated with a customer account, though these terms may be used somewhat interchangeably depend ending upon the context of use. Users may interact with a provider network across one or more intermediate networks (e.g., the internal via one or more interface(s), such as through use of application programming interface (API) calls, via a console implemented as a website or application, etc. The interface (s) may be part of, or serve as a front-end to, a control plane of the provider network that includes "backend" services supporting and enabling the services that may be more directly offered to customers.

To provide these and other computing resource services, provider networks often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved).

Yet another deployment configuration 300C involves deploying both the normalization model 110 and the model 114 within a provider network 310B (e.g., as part of a machine learning service 315), and thus, the electronic device 305C that includes the second sensor stack 102B can provide the "raw" sensor data to the provider network 310B. The user or owner of the electronic device 305C may specify the particular normalization model 110 to be used to normalize the sensor data (e.g., in a message carrying the sensor data, at an earlier time via a console or Application Programming Interface (API) call), or may include an identifier of the second sensor stack 102B used to generate the sensor data and thus the provider network 310B can use the identifier to identify a corresponding normalization model 110 to be used.

Figure 4:
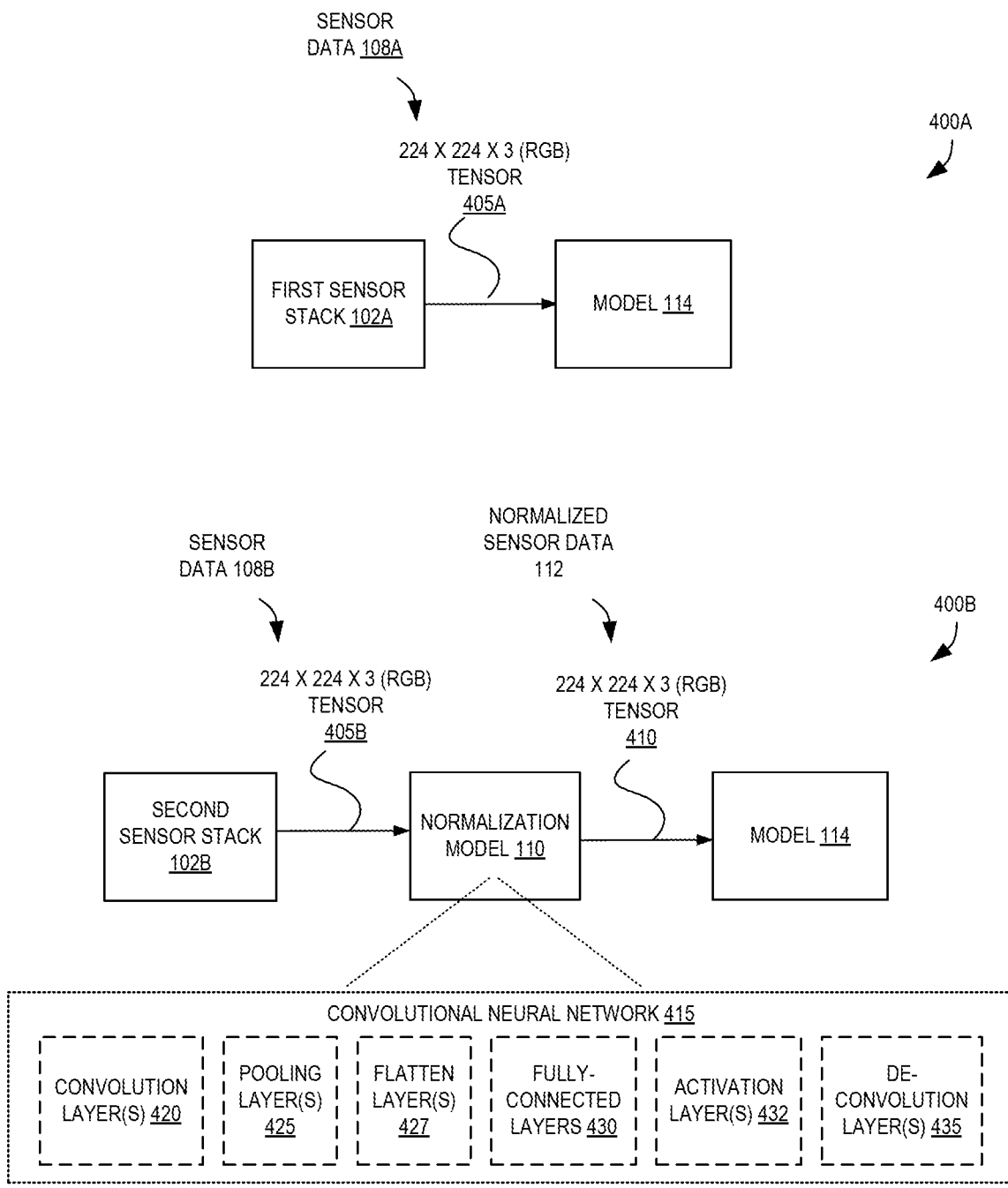
FIG. 4 is a diagram illustrating sensor data and the normalization of sensor data with heterogeneous sensor stacks and an exemplary normalization model according to some embodiments.

As described herein, a variety of types of sensor stacks and devices can be utilized in various embodiments, and thus the type of sensor data (and normalized sensor data) may similarly be of a variety of types and/or formats relevant to the particular environment of use. For example, FIG. 4 is a diagram illustrating sensor data and the normalization of sensor data with heterogeneous sensor stacks and an exemplary normalization model according to some embodiments. As shown at 400A, the first sensor stack 102A in some embodiments can be a camera device that produces sensor data 108A in the form of, for example, an image in the form of a 224 by 224 by 3 tensor 405A that comprises a Red Green Blue (RGB) representation of the image.

Similarly, as shown at 400B, the second sensor stack 102B may also produce sensor data 108B in the form of a 224×224×3 tensor 405B, which is operated upon by a normalization model 110 to produce a normalized 224× 224×3 tensor 410 as the normalized sensor data 112.

In this example, the normalization model 110 is shown as comprising a convolutional neural network 415 with one or more of: one or more convolution layers 420 to extract features (or feature maps) from the input tensor 405B, one or more pooling layers 425 to reduce the dimensionality of each feature map while retaining the most important information, multiple fully-connected layers 430 (e.g., to perform classification/analysis), and one or more de-convolution layers 435 to bring the data back to its original size (e.g., 224×224×3) to be output as the tensor 410.

Figure 5:
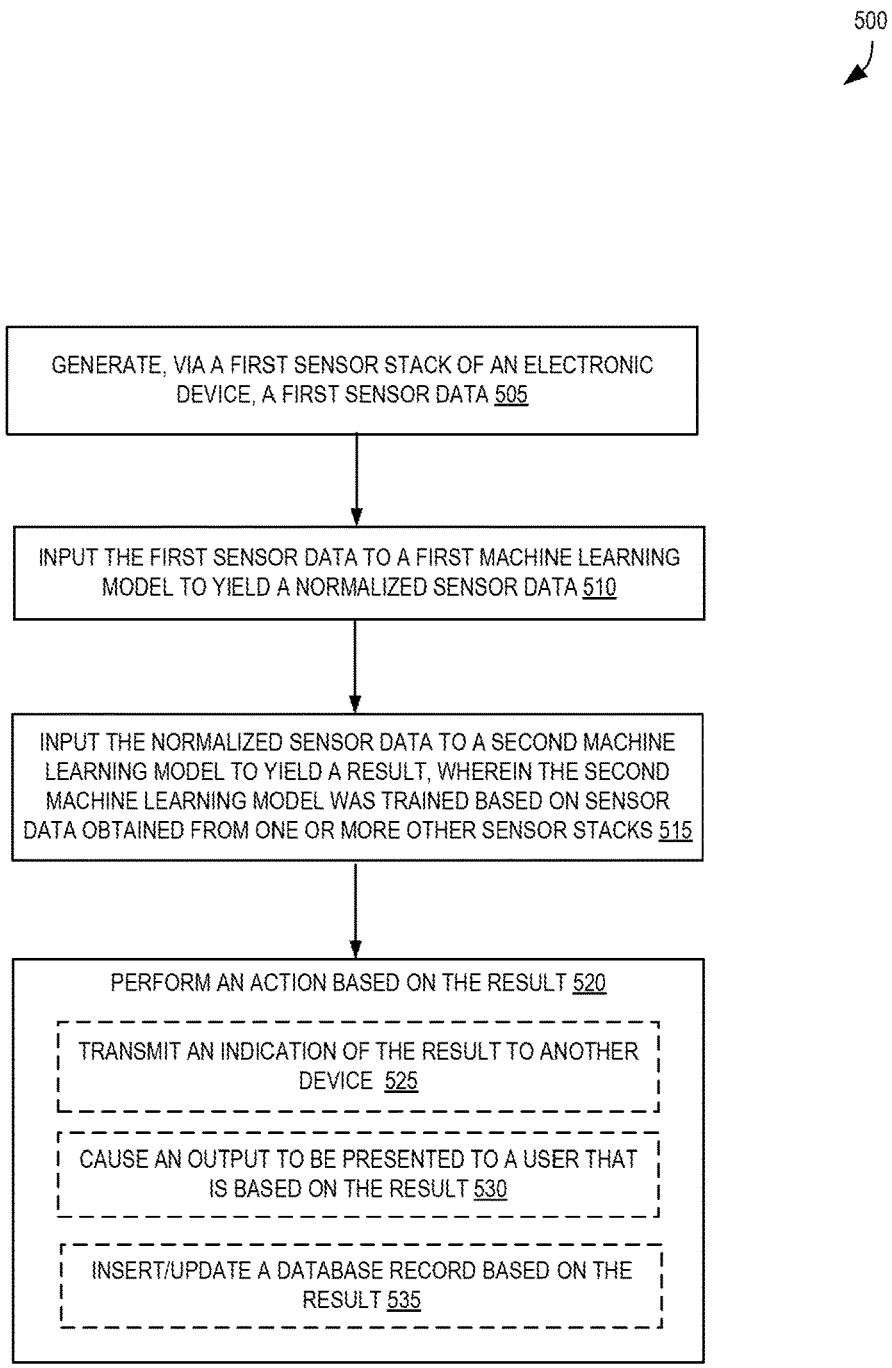
FIG. 5 is a flow diagram illustrating operations for model reutilization via sensor data auto-normalization according to some embodiments.

FIG. 5 is a flow diagram illustrating operations 500 for model reutilization via sensor data auto-normalization according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

The operations 500 include, at block 505, generating, via a first sensor stack of an electronic device, a first sensor data. For example, the first sensor stack may periodically generate the first sensor data (e.g., every 100 milliseconds, every one second, every minute, etc.), or may generate the first sensor data responsive to a user input or request. The first sensor stack may be any of a variety of types of sensor components that can generate digital data based on "observed" physical environmental characteristics such as light, sound, electrical signals, particles, etc. The electronic device can similarly be any of a variety of types of devices, including but not limited to camera devices, personal assistant devices, environmental sensor devices, biological monitoring devices, etc. The operations of block 505 may be performed by the electronic device that includes the first sensor stack.

The operations 500 also include, at block 510, inputting the first sensor data to a first machine learning model to yield a normalized sensor data. The first machine learning model may comprise a deep model such as a multi-layer neural network like a convolutional neural network, recurrent neural network, etc. The first machine learning model may be trained to adjust or "normalize" sensor data coming from the first sensor stack so that when used with a second machine learning model (e.g., trained using sensor data from one or more other sensor stacks) the second machine learning model will still perform similarly to (or the same as) using the second machine learning model with sensor data from those one or more other sensor stacks. The operations of block 505 may be performed by an electronic device including the first sensor stack and including the first machine learning model (e.g., in a volatile or non-volatile memory or storage), or in some embodiments, performed by an electronic device of a provider network (e.g., after receiving the first sensor data from the electronic device) that hosts the first machine learning model.

At block 515, the operations 500 include inputting the normalized sensor data to a second machine learning model to yield a result. The result may include one or more predicated classifications, a confidence of each of the predicted classifications (e.g., being correct), a predicated value, etc. The second machine learning model was trained based on sensor data obtained from one or more other sensor stacks. For example, the second machine learning model may have been trained using images from smart device cameras, consumer digital cameras, etc. The operations of block 515 may be performed by the electronic device including the first sensor stack and further including the second machine learning model, though in some embodiments the operations may be performed by an electronic device of a provider network that hosts the second machine learning model (and optionally the first machine learning model).

The operations 500 include, at block 520, performing an action based on the result. For example, in some embodiments, block 520 includes block 525 and transmitting an indication of the result to another device. For example, the result (and/or a description or indicator thereof) may be provided to another device for storage and later analysis, to another service or application to be used for further analysis, etc. As another example, in some embodiments, block 520 includes block 530 and causing an output to be presented to a user that is based on the result. For example, an alert (e.g., an electronic message such as a Short Message Service (SMS) message, a push notification, an email, an audio output or "alarm", etc.) may be generated based on a detection of a particular environmental occurrence detected via the sensor data. As another example, in some embodiments, block 520 includes block 535 and inserting and/or updating a database record based on the result, e.g., to record an occurrence of a detected object, to adjust a customer record based on a detected activity, etc. The operations of block 520 may be performed by the electronic device, though in some embodiments the operations may be performed by an electronic device of a provider network.

Figure 6:
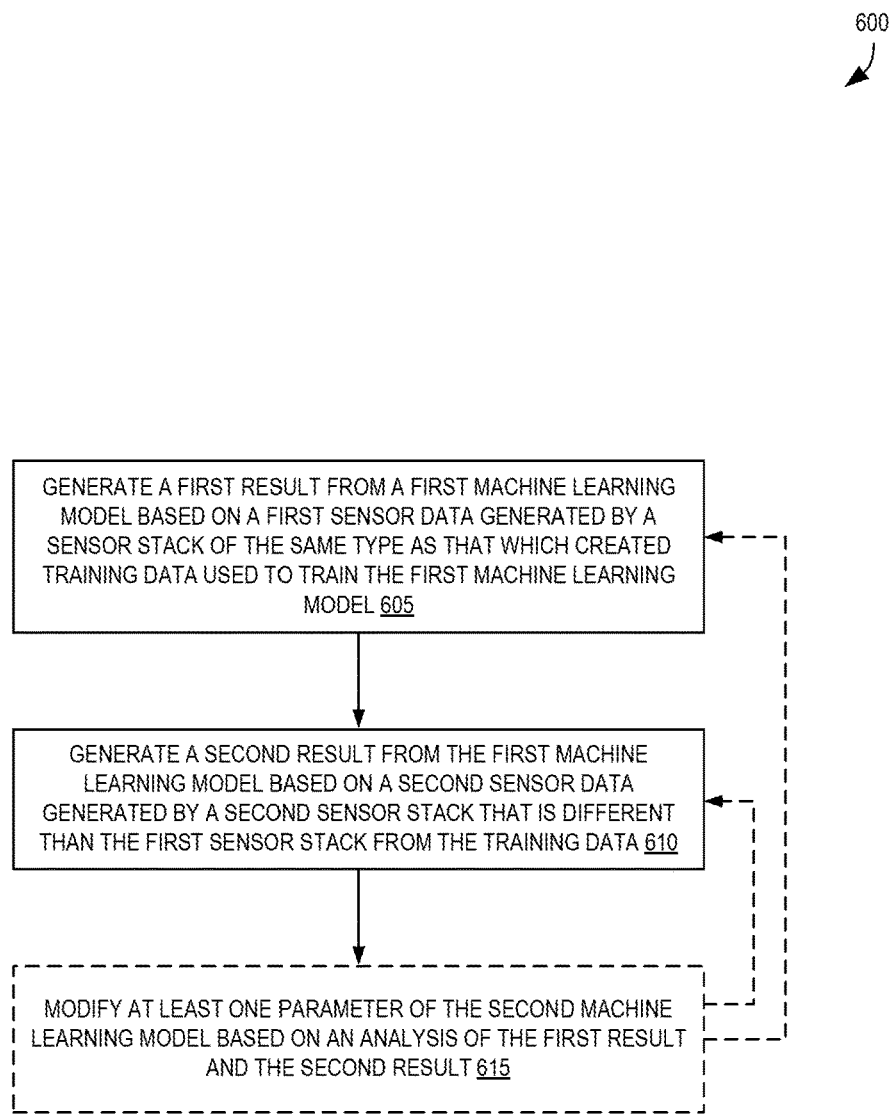
FIG. 6 is a flow diagram illustrating operations for training normalization models according to some embodiments.

FIG. 6 is a flow diagram illustrating operations 600 for training normalization models according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. By way of example, in some embodiments one or more of the operations may be performed by a normalization model adapter 206 of FIG. 2, which may be part of a provider network.

The operations 600 may include obtaining a plurality of training data elements, such as a plurality of images, sound recordings, etc., that can be used as training data.

In some embodiments, for each of the plurality of training data elements, a set of operations 605-615 is performed.

The operations 600 include, at block 605, generating a first result from a first machine learning model based on a first sensor data generated by a sensor stack of the same type as that which created training data used to train the first machine learning model. For example, the first machine learning model may have been generated using previous training data from a device or devices utilizing a first type of sensor stack to generate that data. One of the plurality of training data elements can be "sensed" by a sensor stack of that same first type to generate the first sensor data. This first sensor data can be provided to the first machine learning model as an input to yield the first result.

The operations 600 include, at block 610, generating a second result from the first machine learning model based on a second sensor data generated by a second sensor stack that is different than the first sensor stack from the training data. For example, a second sensor stack may sense the one of the plurality of training data elements to create second sensor data. This second sensor data may flow through (and in many, but possibly not all cases, be modified by) the second machine learning model (e.g., to yield normalized data) and be thereafter provided as an input to the first machine learning model, which yields the second result.

The operations 600 also include, at block 615, modifying at least one parameter (e.g., one or more hyperparameters as described herein) of the second machine learning model based on an analysis of the first result and the second result. For example, one or more hyperparameters may be modified based on how portions of the first result and the second result differ. For example, if a predicted class (and/or confidence) associated with the first result and the second result for a same training data differ, one or more hyperparameter values may be modified using techniques known to those of skill in the art to attempt to cause the first result and the second result to converge.

In some embodiments, upon modifying the one or more parameters of the second machine learning model, the second sensor data (for the corresponding training data element) may again be fed through the second machine learning model and the output thereof may again be provided as input to the first machine learning model to generate another "updated" second result (as described in block 610). Block 615 may again be performed if the updated second result and the previous first result continue to differ, allowing for the parameters to be repeatedly updated/modified to "tune" the second machine learning model.

At some point, the flow of operations 600 may continue back to block 605, e.g., for a next training data element of the plurality of training data elements. This may occur, for example, when the difference between the first result and a (latest) second result have converged (e.g., are the same, are within a threshold amount of each other, etc.)

Figure 7:
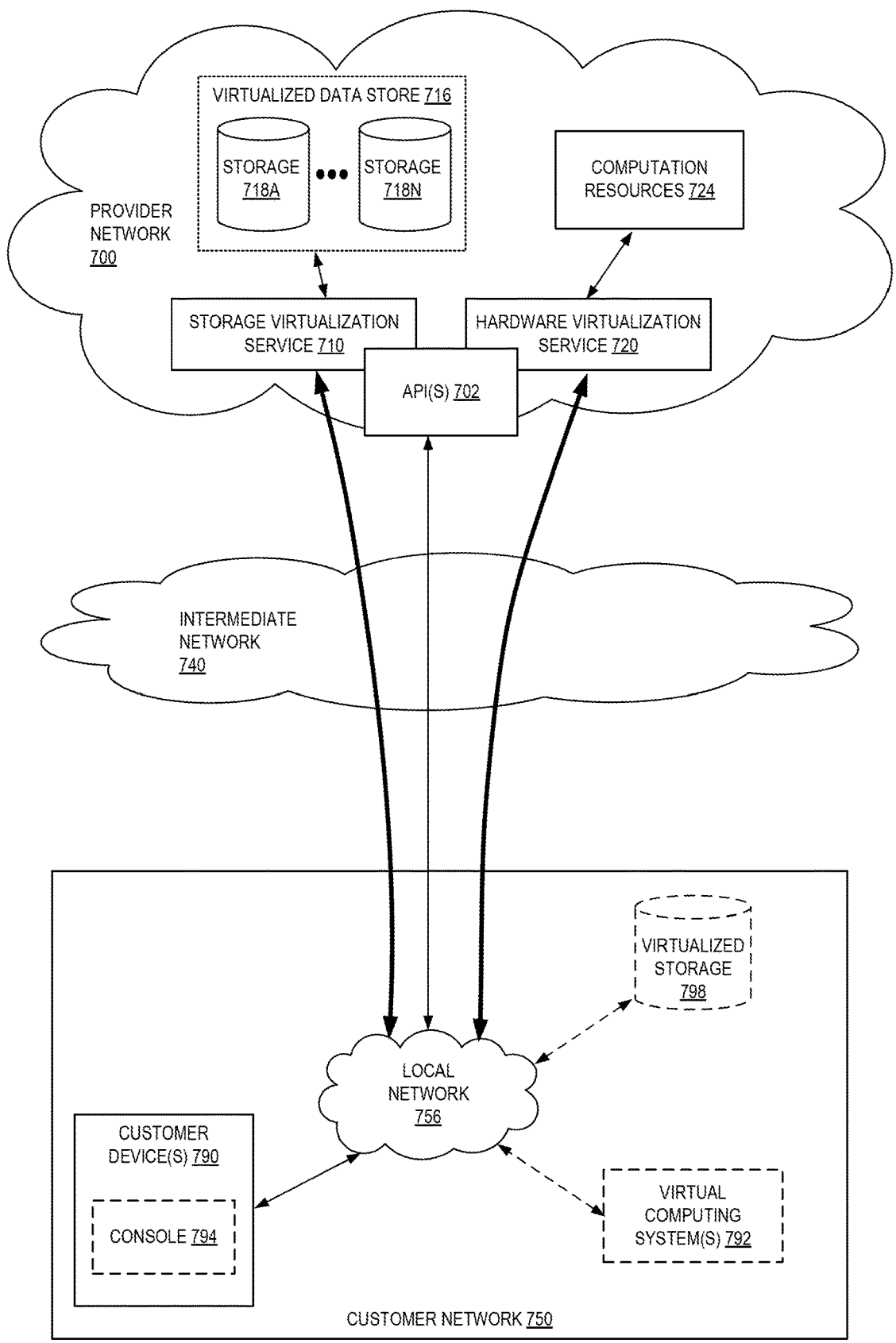
FIG. 7 is a block diagram of an example provider network that provides a storage virtualization service and a hardware virtualization service to customers according to some embodiments.

As described herein, in some embodiments a provider network may be utilized such as by training and/or hosting a normalization model, machine learning models, and/or applications that utilize the results generated by the machine learning models described herein. FIG. 7 is a block diagram of an example provider network that provides a storage virtualization service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local Internet Protocol (IP) addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
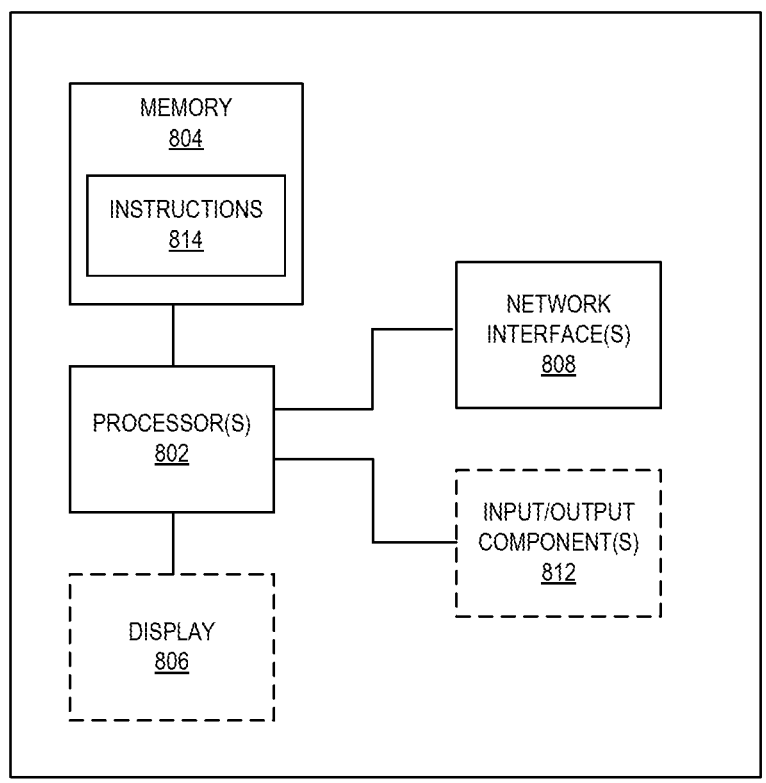
FIG. 8 illustrates a logical arrangement of a set of general components of an exemplary computing device that can be utilized in accordance with various embodiments.

FIG. 8 illustrates a logical arrangement of a set of general components of an example computing device 800 such as an electronic device including a sensor stack, implementing a normalization model adapter 206, etc. Generally, a computing device 800 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 802 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 804) to store code (e.g., instructions 814) and/or data, and a set of one or more wired or wireless network interfaces 808 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 804) of a given electronic device typically stores code (e.g., instructions 814) for execution on the set of one or more processors 802 of that electronic device. One or more parts of various embodiments may be implemented using different combinations of software, firmware, and/or hardware.

A computing device 800 can include some type of display element 806, such as a touch screen or liquid crystal display (LCD), although many devices such as portable media players might convey information via other means, such as through audio speakers, and other types of devices such as server end stations may not have a display element 806 at all. As discussed, some computing devices used in some embodiments include at least one input and/or output component(s) 812 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 9:
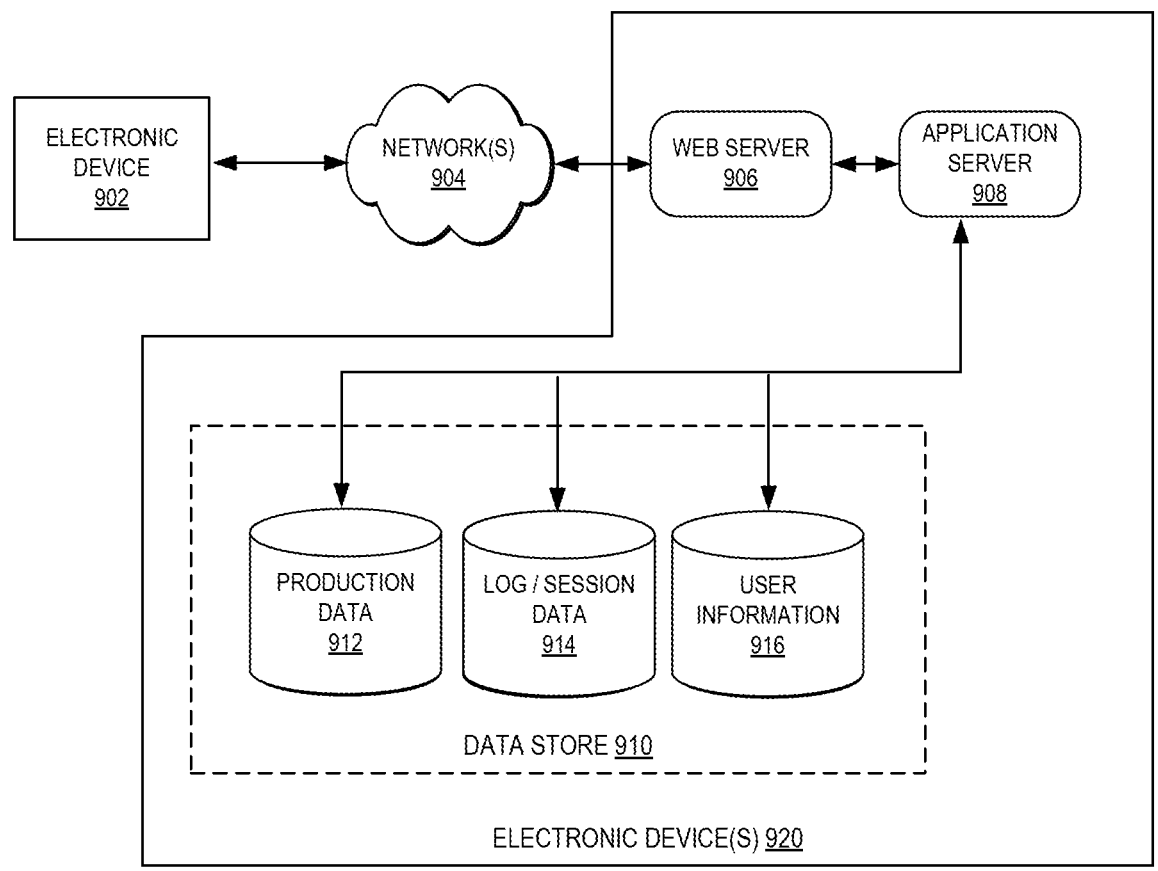
FIG. 9 illustrates an example of an environment for implementing aspects in accordance with various embodiments.

As discussed, different approaches can be implemented in various environments in accordance with the described embodiments. FIG. 9 illustrates an example of an environment 900 for implementing aspects in accordance with various embodiments. For example, some embodiments utilize HyperText Transfer Protocol (HTTP) request messages that are received by a web server (e.g., web server 906), and the users, via electronic devices, may interact with the provider network via a web portal provided via the web server 906 and application server 908. As will be appreciated, although a web-based environment is used for purposes of explanation, different environments may be used, as appropriate, to implement various embodiments. The system includes an electronic client device 902, which may also be referred to as a client device and can be any appropriate device operable to send and receive requests, messages or information over an appropriate network 904 and convey information back to a user of the device 902. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 904 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 904 includes the Internet, as the environment includes a web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device 902 and handling a majority of the data access and business logic for an application. The application server 908 provides access control services in cooperation with the data store 910 and is able to generate content such as text, graphics, audio, video, etc., to be transferred to the client device 902, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 902 and the application server 908, can be handled by the web server 906. It should be understood that the web server 906 and application server 908 are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store 910 also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store 910 might access the user information 916 to verify the identity of the user and can access a production data 912 to obtain information about items of that type. The information can then be returned to the user, such as in a listing of results on a web page that the user is able to view via a browser on the user device 902. Information for a particular item of interest can be viewed in a dedicated page or window of the browser.

The web server 906, application server 908, and/or data store 910 may be implemented by one or more electronic devices 920, which can also be referred to as electronic server devices or server end stations, and may or may not be located in different geographic locations. Each of the one or more electronic devices 920 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 102A-102B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A system comprising:
a plurality of electronic devices in a provider network including instructions, which when executed, cause one or more of the plurality of electronic devices to:
train normalization machine learning (ML) models corresponding to different types of sensor stacks, wherein each of the ML models is trained based on use of a first ML model that itself was trained using training data obtained from one or more other electronic devices having one or more other sensor stacks;
obtain a first digital image generated by a first sensor stack, of a camera device external to the provider network, including one or more components that sense one or more environmental characteristics comprising light, the one or more components including a lens, a sensor, and an image signal processor;
determine an identifier associated with the first sensor stack that was used to generate the first digital image;
select, from amongst the trained ML models, a second ML model for use based at least in part on the identifier associated with the first sensor stack;
utilize the first digital image with the second ML model to yield a normalized sensor data;
input the normalized sensor data to the first ML model to yield a result; and
perform an action based on the result.

2. The system of claim 1, wherein the second ML model was generated by:
a generation, with the first ML model and a first set of training images that were generated using at least one of the one or more other sensor stacks, of a first set of results;
a generation of sensor data using the first sensor stack to capture environmental characteristics of common subject matter as represented within the first set of training images;
an input of the sensor data into the first ML model to yield a second set of results;
an analysis of the first set of results and the second set of results; and
a modification of parameters of the second ML model based on the analysis.

3. The system of claim 1, wherein the second ML model was generated by:
a generation of a first sensor data using one of the one or more other sensor stacks to capture environmental characteristics of a subject;
an input of the first sensor data into the first ML model to yield a first set of results;
a generation of a second sensor data using the first sensor stack to capture environmental characteristics of the subject;
an input of the second sensor data into the first ML model to yield a second set of results;
an analysis of the first set of results and the second set of results; and
a modification of parameters of the second ML model based on the analysis.

4. A system comprising:
a plurality of electronic devices in a provider network including instructions, which when executed, cause one or more of the plurality of electronic devices to:
train normalization machine learning (ML) models corresponding to types of sensor stacks based on use of a first ML model;
receive digital sensor data generated by a first sensor stack of a first electronic device, the first sensor stack including one or more components to generate digital sensor data based on one or more environmental characteristics;
determine an identifier associated with the first sensor stack that was used to generate the digital sensor data or associated with a type of the first electronic device;
select, based on the identifier, a second ML model from amongst the normalization ML models;
utilize the digital sensor data to provide input to the second ML model to yield normalized data; and
utilize the normalized data to provide input for the first ML model to yield a result, wherein the first ML model was generated using training data obtained from one or more other electronic devices having one or more other sensor stacks that are different than the first sensor stack.

5. The system of claim 4, wherein the identifier associated with the first sensor stack is received within a message originated on behalf of a user associated with the first electronic device.

6. The system of claim 4, wherein the instructions when executed further cause the one or more electronic devices to:
transmit, an indication of the result to another electronic device; or
cause, via a display device or an audio output device, an output to be generated that is based on the result.

7. The system of claim 4, wherein the one or more environmental characteristics sensed by the first sensor stack includes one or more of light, moisture, acceleration, sound, temperature, pressure, flow, proximity, gas, chemical, or bioelectric signals.

8. The system of claim 7, wherein the first electronic device comprises one of: a camera device, an audio recording device, a cellular device, a tablet device, a water sensor device, a motion sensor device, or a biomedical sensor device.

9. The system of claim 5, wherein the message that included the identifier further included the digital sensor data.

10. The system of claim 5, wherein the message that included the identifier was received prior to the receipt of the digital sensor data.

11. The system of claim 4, wherein the second ML model comprises a convolutional neural network.

12. The system of claim 4, wherein the second ML model was generated by:
performing a training process, the training process including a plurality of iterations each including:
generating a first result from the first ML model;
generating a second result from the first ML model; and
modifying at least one parameter of the second ML model based on an analysis of the first result and the second result.

13. A method comprising:
training a plurality of normalization machine learning (ML) models based at least in part on use of a first ML model;
receiving, at a provider network from an electronic device, a first sensor data generated through use of a first sensor stack of the electronic device;
determining an identifier associated with the first sensor stack that was used to generate the first sensor data or associated with a type of the electronic device;
selecting, based on the identifier, a second ML model from amongst the plurality of normalization ML models;
utilizing the first sensor data to provide input to the second ML model to yield a normalized sensor data;
utilizing the normalized sensor data to provide input to the first ML model to yield a result, wherein the first ML model was trained based at least in part on sensor data obtained from one or more other sensor stacks producing sensor data having a different distribution than a distribution of the first sensor data generated by the first sensor stack; and
transmitting an indication of the result to another device or causing an output to be presented to a user that is based on the result.

14. The method of claim 13, wherein the first ML model and the second ML model are hosted within the provider network, wherein the provider network is geographically separate from the electronic device.

15. The method of claim 14, wherein the electronic device comprises a camera device or a speaker device.

16. The method of claim 15, wherein the one or more other sensor stacks are from one or more other types of camera devices or speaker devices.

17. The method of claim 16, wherein at least one of the one or more other sensor stacks is from a smartphone device.

18. The method of claim 13, wherein the first sensor stack, to generate the first sensor data, senses one or more environmental characteristics including one or more of light, moisture, acceleration, sound, temperature, pressure, flow, proximity, gas, chemical, or bioelectric signals.

19. The method of claim 13, wherein the second first ML model comprises a convolutional neural network.

20. The method of claim 13, further comprising:
performing a training process to generate the second ML model, the training process including a plurality of iterations each including:
generating a first result from the first second ML model;
generating a second result from the first second ML model; and
modifying at least one parameter of the second first ML model based on an analysis of the first result and the second result.

* * * * *